United States Patent [19]

Imanishi et al.

[11] Patent Number: 4,641,214
[45] Date of Patent: Feb. 3, 1987

[54] ROTARY HEAD ASSEMBLY WITH PUMP-OUT TYPE SPIRAL GROOVES FOR MORE STABLE TAPE RUNNING

[75] Inventors: Kiyokazu Imanishi; Hiroyuki Naka, both of Osaka; Yasuo Sakurai, Neyagawa; Takashi Ichiyanagi, Hirakata; Masaru Kishimoto, Nara, all of Japan

[73] Assignee: Matsushita Electric Industrial Co., Ltd., Osaka, Japan

[21] Appl. No.: 606,436

[22] PCT Filed: Aug. 18, 1983

[86] PCT No.: PCT/JP83/00270

§ 371 Date: Apr. 20, 1984

§ 102(e) Date: Apr. 20, 1984

[30] Foreign Application Priority Data

Aug. 20, 1982 [JP] Japan .................. 57-145023

[51] Int. Cl.$^4$ ................ G11B 15/60; G11B 5/027
[52] U.S. Cl. ................ 360/130.24; 360/84; 360/130.22; 360/102; 226/97
[58] Field of Search ........... 360/85, 107, 109, 130.22, 360/130.24, 84, 95, 102, 90, 129, 104; 226/97

[56] References Cited

U.S. PATENT DOCUMENTS 3,995,317 11/1976 Schmidt ........................ 360/84
4,366,516 12/1982 Ogata et al. .................. 360/130.24
4,392,168 7/1983 Maruyama et al. ............ 360/130.24
4,455,584 6/1984 Heitmann ..................... 360/130.24
4,525,757 6/1985 Imanishi et al. ............... 360/84

FOREIGN PATENT DOCUMENTS 39-16166   8/1964 Japan ................... 360/130.24
51-108306  9/1976 Japan ................... 360/84
52-24507   2/1977 Japan ................... 360/84
52-24506   2/1977 Japan ................... 360/130.24
53-129009 11/1978 Japan ................... 360/130.22
56-137549 10/1981 Japan ................... 360/84
57-12412   1/1982 Japan ................... 360/84
57-19536   7/1982 Japan ................... 360/84
57-198531 12/1982 Japan ................... 360/130.24
58-37866   5/1983 Japan ................... 360/84
59-36361   2/1984 Japan ................... 360/84

Primary Examiner—John H. Wolff
Assistant Examiner—Alfonso Garcia
Attorney, Agent, or Firm—Wenderoth, Lind & Ponack

[57] ABSTRACT

In a rotary head assembly in which a rotary member (14) provided with a magnetic head (23) in the gap between the upper and the lower fixed cylinders (17 and 18) having nearly equal diameters and arranged coaxially with each other is turned, use is made of a structure such that the upper and the lower fixed cylinders (17 and 18) are secured in place and supported by a fixed shaft arranged coaxially therewith, whereby more stable magnetic tape running has been realized, while achieving ease of assembling with high accuracy and reduction of power consumption.

6 Claims, 3 Drawing Figures

ROTARY HEAD ASSEMBLY WITH PUMP-OUT TYPE SPIRAL GROOVES FOR MORE STABLE TAPE RUNNING

FIELD OF THE INVENTION

The present invention relates to a rotary head assembly of video tape recorder (hereinafter called VTR) and particularly pertains to a rotary head assembly of a type having its upper and lower cylinders secured in place on a fixed central shaft, which leads itself to ease of assembling, reduced power consumption and further stabler magnetic tape running.

BACKGROUND OF THE INVENTION

There are available various types of construction for a rotary head assembly of a VTR. For example, a basic type is constructed of two cylindrical bodies (hereinafter called cylinder) having nearly equal ODs which are arranged coaxially with each other.

FIG. 1 shows an example of the structure of a conventional rotary head assembly. Referring to FIG. 1, 1 denotes a rotary shaft, which is rotatably supported by bearings 2 and 3 which is rotationally driven by a driving motor (not shown in this figure). Magnetic head 4 is secured on the rotary shaft 1 through a member 5, to be rotated at a specified speed. Upper fixed cylinder 6 is bound coaxially to lower fixed cylinder 8 through a member 7 and the lower fixed cylinder 8 is, in turn, secured in position on a base of the VTR. Numerals 9 and 10 designate collars or sleeves and 11 a bearing retaining ring. The structure of the conventional rotary head assembly such as shown in FIG. 1 has defects as described hereunder:

(1) It is difficult to align the axial center of the upper fixed cylinder and that of the lower fixed cylinder at a desired accuracy.

(2) In the small rotary head assembly which is employed in a 8 mm type portable video camera having a camera and video tape recorder combined as a single unit, its cylinder diameter is reduced to about ⅔, and the magnetic tape width to ½, as compared with a conventional video rotary head assembly utilizing a ½ inch width magnetic tape, but its rotational speed is still the same as the conventional speed of 1,800 rpm. For this reason, in order to have an adequate running distance of the magnetic head on the magnetic tape per one TV picture frame, the angle that the running surface of the magnetic head makes with the running direction of the magnetic tape needs to be reduced from that in the conventional assembly. To effect this, the angle at which the magnetic tape is wound on the cylinders, which is approx. 190° in the case of the conventional ½ inch tape must be increased to approx. 220° in the 8 mm type camera. This makes impractical the upper cylinder fixing method such as shown in FIG. 1.

SUMMARY OF THE INVENTION

According to this invention, a rotary head assembly is provided having a member with a magnetic head which is turned in a gap between an upper and a lower fixed or stationary cylinder having nearly equal diameters arranged coaxially with each other and a magnetic tape which is helically wound around or runs on the peripheral surfaces of the aforementioned upper and lower fixed cylinders, the upper fixed cylinder being fixedly attached to a central shaft coaxially arranged therewith, for ease of assembling with high accuracy, reduced power consumption and more stable magnetic tape running.

THE MOST PREFERABLE EMBODIMENT OF THIS INVENTION

Figure 2:
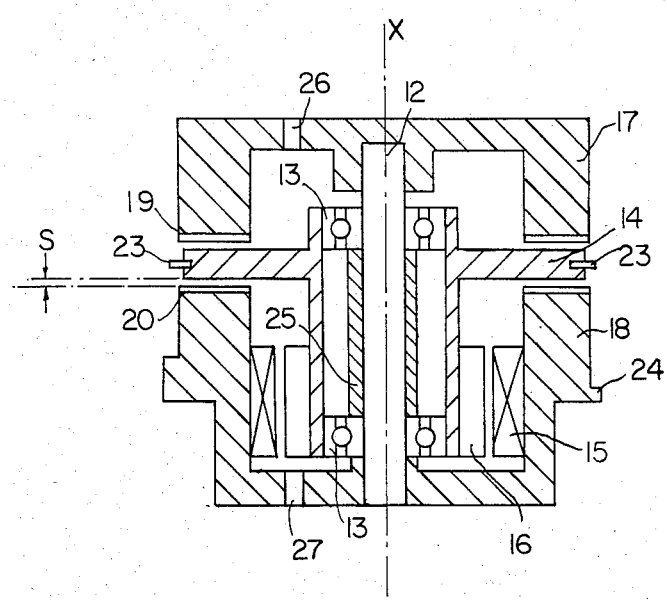
FIG. 2 is a front sectional view of a rotary head assembly embodying this invention.
Figure 3:
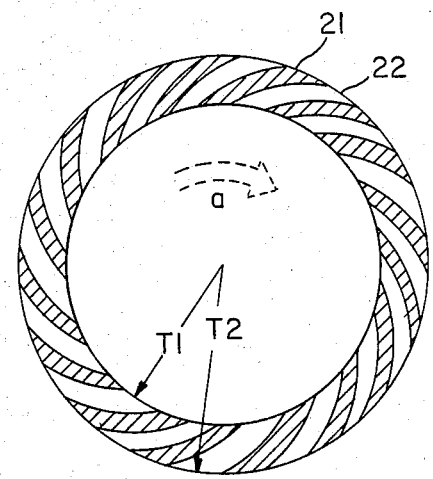
FIG. 3 is a bottom view of the upper fixed cylinder 17 of FIG. 2.

FIGS. 2 and 3 present an embodiment of this invention. FIG. 2 is a sectional view of a rotary head assembly embodying this invention and FIG. 3 is a bottom view of its upper fixed cylinder.

Referring to FIG. 2, 12 denotes a fixed shaft having a central axis extending in an axial direction, 13 bearings, 14 a rotary member, 15 and 16 magnet and coil composing a direct drive motor which rotationally drive the rotary member 14 and on the respective lower axial end surface and the upper axial end surface of the upper fixed or stationary cylinder 17 and the lower fixed or stationary cylinder 18, which are coaxial with each other, pump-out type spiral grooves 19 and 20 are provided. The rotary member has a disc portion 14 which is rotated with a minute clearance "s" between the upper and lower surfaces thereof with each of the end surfaces of the upper and the lower fixed cylinders. The pattern of the spiral groove is formed radially and spirally on the bottom surface of the upper fixed cylinder with ID $T_1$ and OD $T_2$, as roughly shown in FIG. 3. In this figure, the parts shown with cross-hatching indicate the groove parts 21, while the other parts 22 represent the land parts. In FIG. 2, 23 designates a magnetic head, 24 a guide which regulates the running position of the magnetic tape in its width direction, 25 a bearing retaining ring, and 26 and 27 vent holes for communicating between the interior and exterior sides of the rotary head assembly. The arrow mark a in FIG. 3 indicates the turning direction of the rotary member 14.

In the following, there is set out an explanation of the operation of the rotary head assembly composed as hereinabove described:

As the rotary member 14 is rotationally driven by means of the magnet 15 and the coil 16, the air inside the rotary head assembly is discharged through minute clearances a between the upper and the lower fixed cylinders 17 and 18 and the rotary member 14 by the hydrodynamic action of the spiral grooves 19 and 20. The air discharged outwardly gives the magnetic tape a buoying force, forming a uniform air film all over the part of the peripheral surface of the upper and lower cylinders of the rotary head assembly on which the magnetic tape slides, whereby the sliding contact between the magnetic tape and the rotary head assembly is averted and stable and smooth tape running is realized.

In the embodiment of FIG. 2, the spiral grooves are provided on the end surfaces of the upper and the lower fixed cylinders, but the spiral grooves may be provided on the end surfaces of the upper and the lower fixed cylinders which are formed conical. This structure is especially effective in increasing the effective area of the spiral groove.

Figure 1:
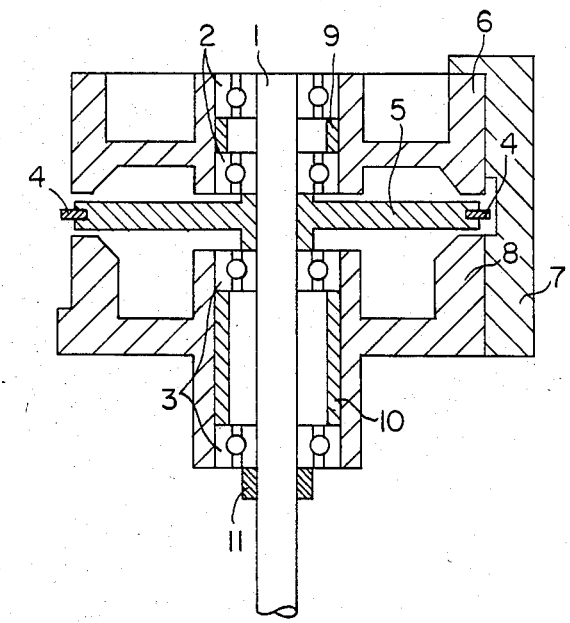
FIG. 1 is a front sectional view of a conventional rotary head assembly.

As described in the foregoing, according to this embodiment, the upper fixed cylinder is secured in place and supported on a fixed shaft coaxially with the lower fixed cylinder and the rotary member on which the magnetic head is mounted is turned. In this way, following improvements are achieved, as compared with the conventional assembly shown in FIG. 1:

(1) Since the upper cylinder is secured in place and supported by the fixed central shaft, coaxiality of the upper and the lower fixed cylinders is readily ensured and with high accuracy, in assembling them.

(2) The angle at which the magnetic tape is wound on the cylinder may be increased, resulting in an advantage in miniaturization of cylinders. Actually, even when the angle at which the magnetic tape is wound on the cylinders is larger than about 220°, as in the rotary head assembly of 8 mm type portable video camera, for example, employment of the upper cylinder fixing system is feasible by use of the structure shown in FIG. 3.

(3) By taking advantage of the air discharging effect of the pump-out type spiral grooves, the magnetic tape is buoyed up from the outer peripheral surfaces of the upper and the lower fixed cylinders, whereby more stable tape running may be realized, while preventing wear of the magnetic tape and cylinders.

INDUSTRIAL APPLICABILITY

As hereinabove described, the upper fixed cylinder is secured in place and supported by a fixed shaft coaxially arranged therewith and a rotary member provided with a magnetic head which is turned coaxially with the fixed shaft is arranged in the gap between the upper and the lower fixed cylinders, with pump-out type spiral grooves provided on the lower end surface of the upper fixed cylinder and the upper end surface of the lower fixed cylinder, whereby more stable tape running may be realized, while achieving ease of assembling with high accuracy and reduction of power consumption.

What is claimed is:

1. A rotary head assembly comprising:
   a shaft having a central axis extending in an axial direction;
   an upper stationary cylinder fixedly attached to an upper end of said shaft, said upper cylinder having a lower axial end surface spaced radially from said central axis, said lower axial end surface having pump-out type spiral grooves thereon;
   a lower stationary cylinder fixedly attached to a lower portion of said shaft, said lower cylinder having an upper axial end surface spaced radially from said central axis and being coaxial with said lower axial end surface of said upper cylinder, said upper axial end surface having pump-out type spiral grooves thereon;
   a rotary member rotatably supported on said shaft between said upper cylinder and said lower cylinder, said rotary member having a portion thereof extending between said axial end surfaces of said upper and lower cylinders, said portion having an upper surface which is spaced from said lower axial end surface of said upper cylinder by a minute clearance and a lower surface which is spaced from said upper axial end surface of said lower cylinder by a minute clearance;
   at least one magnetic head mounted on a radially outer surface of said portion of said rotary member, said at least one magnetic head protruding outward from a radially outer surface of said upper cylinder and a radially outer surface of said lower cylinder, said radially outer surfaces of said upper and lower cylinders being nearly equal in diameter; and
   means for rotating said rotary member.

2. The rotary head assembly of claim 1, further comprising vent means disposed in said rotary head assembly for passage of air into said rotary head assembly, said spiral grooves effecting discharge of air between said portion of said rotary member and said axial end surfaces of said upper and lower cylinders.

3. The rotary head assembly of claim 2, wherein said vent means includes a vent hole provided in said upper cylinder.

4. The rotary head assembly of claim 2, wherein said vent means includes a vent hole provided in said lower cylinder.

5. The rotary head assembly of claim 1, wherein said rotating means comprises a direct drive motor.

6. The rotary head assembly of claim 5, wherein said direct drive motor includes a magnet mounted on an inner surface of said lower cylinder and a coil mounted on said rotary member radially inward of said magnet.

* * * * *